Aug. 21, 1956 H. E. BURKE 2,759,784

DECIMAL-DIGITAL RECORDING SYSTEM

Filed Dec. 9, 1950 2 Sheets-Sheet 1

INVENTOR.
HARRY E. BURKE
BY James B. Christie
ATTORNEY

INVENTOR.
HARRY E. BURKE
BY James B. Christie
ATTORNEY

United States Patent Office 2,759,784

Patented Aug. 21, 1956

2,759,784

DECIMAL-DIGITAL RECORDING SYSTEM

Harry E. Burke, Pasadena, Calif., assignor, by mesne assignments, to Consolidated Electrodynamics Corporation, Pasadena, Calif., a corporation of California Application December 9, 1950, Serial No. 199,995

9 Claims. (Cl. 346—33)

This invention deals with automatic recording and relates specifically to a method and apparatus for recording digital data as a binary notation readable as a decimal digit.

The recording field may be divided into either direct or processed recording and in either case may be sampled or continuous. The present invention relates to direct recording by sampling the function to be measured and recorded and enables reduction of the data to record form with an accuracy of 1/10 of 1% while still allowing visual identification of trends.

The concept of binary numbers finds extensive use in electronic computation since all information is handled in the computer as the presence or absence of a pulse. The presently described recording method embodies the principle of the binary concept in that decimal digits are recorded by means of pulses, that is, in a binary manner. However, in my recording method, and although the digital information is recorded in a binary manner and hence is usable as such, the data is so presented as to be readable directly in digital form and preferably as a decimal digital notation. There is no converson or reconversion of digital to so-called binary numbers required. Moreover, by recording the decimal places of the digital numbers in separate channels, each decimal place being represented by separate binary notations, the 1/10% accuracy referred to above may be obtained without sacrifice of visual indication of trends.

The invention contemplates recording recording decimal digital data as a position significant binary notation, and in the case of a multiple decimal digit each decimal thereof is separately recorded as a position significant binary notation. More specifically, every decimal may be represented by one or a series of marks, the particular decimal being determinable from the record by the location of the mark or marks and totally independently of the shape or size thereof. In this manner recording is accomplished in a binary manner simply as a function of the presence or absence of marks on the record.

In one aspect the method comprises recording electrical digital information on electrolytically sensitive paper by means of a plurality of energizable styli held in contact with the paper. Appropriate ones of the plurality of styli are energized to indicate said digital information in the binary manner manner as described above. In recording a multiple decimal digit each decimal of the digit is, according to preferred practice, separately indicated in a binary manner in separate chart columns. The purpose of this separation is to preserve the visual indication of trends in the data and to simplify visual reduction of the recorded data. Electrical digital information may be that derived from any of a number of commercially available counters. In the usual application a sequence of information is of interest, in which case the recording paper is moved either intermittently or uniformly past the styli.

Where data is not available as an electrical digital signal, the method is modified to include the steps of converting an electrical signal, generally a voltage proportional to the magnitude of the function being measured, to an analogous digit and energizing appropriate ones of the aforementioned styli to indicate the digit as above described. The data to be recorded may in some cases not be in the form of an electrical signal, as for example temperature measurement and the like. In such case, the method of the invention includes the still further step of converting or reducing the data to an analogous electrical voltage. A familiar example of this step is the measurement of temperature by means of a thermocouple wherein a current is caused to flow responsive to variations in the temperature to be measured. This electrical voltage is then converted to an anologous digit which is recorded as above described.

The invention may be more clearly understood by reference to the accompanying drawings illustrating one form of apparatus for carrying out the method of invention and a typical record produced thereby. In the drawings.

Practice of the invention depends upon recording on an electrolytically sensitive paper by means of a styli comb having a plurality of closely adjacent aligned styli contacting the surface of the paper and energizing appropriate ones of the styli to mark the paper in a binary manner representative of digital information and preferably decimal digital information.

Figure 1:
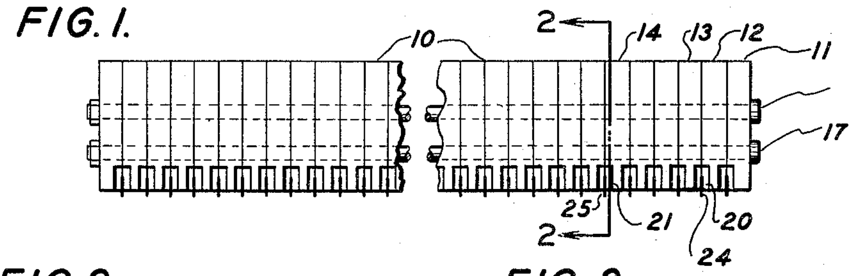
Fig. 1 is a front elevation of a styli comb adapted to contact an electrolytically sensitive paper so that as selected ones of the styli are energized, marks are formed on the paper by the energized styli.
Figure 2:
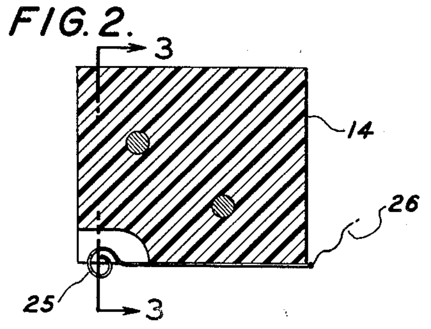
Fig. 2 is a transverse sectional elevation taken on the line 2—2 of Fig. 1.
Figure 3:
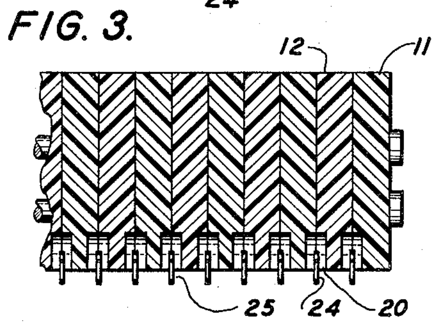
Fig. 3 is a longitudinal sectional elevation taken on the line 3—3 of Fig. 2.

Many types of styli combs can be used, the one illustrated in Figs. 1 to 3 being representative only of the general type of recording head required. Referring to the figure, the comb comprises a head 10 consisting of a plurality of individual substantially rectangular segments 11, 12, 13, 14 etc., bolted face to face by bolts 16, 17 to form the block-shaped head. Each of the separate segments, with the exception of the two end segments, is provided with a pair of arcuate notches at opposite ends of its front lower edge forming a plurality of arcuate grooves 20, 21, etc. in the head between adjoining segments. Styli 24, 25, etc. are housed in these grooves and project below the lower edge of the head. Each of the styli has a lead extending rearwardly along the lower edge of the respective section for connection to energizing means as hereinafter described. A lead 26 is shown connected to the stylus 25 in sectional view in Fig. 2.

The head is conveniently constructed with approximately thirty styli per inch. The styli do not move and furnish essentially a binary notation of on or off information depending on whether or not the individual stylus is energized. The electrolytically sensitive paper on which the recording head records is available commercially in several forms and is sensitive to small currents passed through the paper to leave a mark at the point of injection of this current. Thus, as one of the styli is energized a small current passes through the paper at point of contact of the styli, marking the paper at this point without additional development or other processing.

As remarked above, to record the binary digits to give decimal digital information, each decimal place is represented by a separate column encompassing ten styli. If it is desired to record on a decimal digit systtem of three decimal places, ten of the binary digits are used to represent each digit and a total of thirty styli are thus employed to record each channel. Assuming that time signals, separation of channels, and other items are of interest, a five inch recording head having approximately 150 styli is suitable for a four channel recorder, leaving thirty styli for recordation of such other items of interest.

Figure 4:
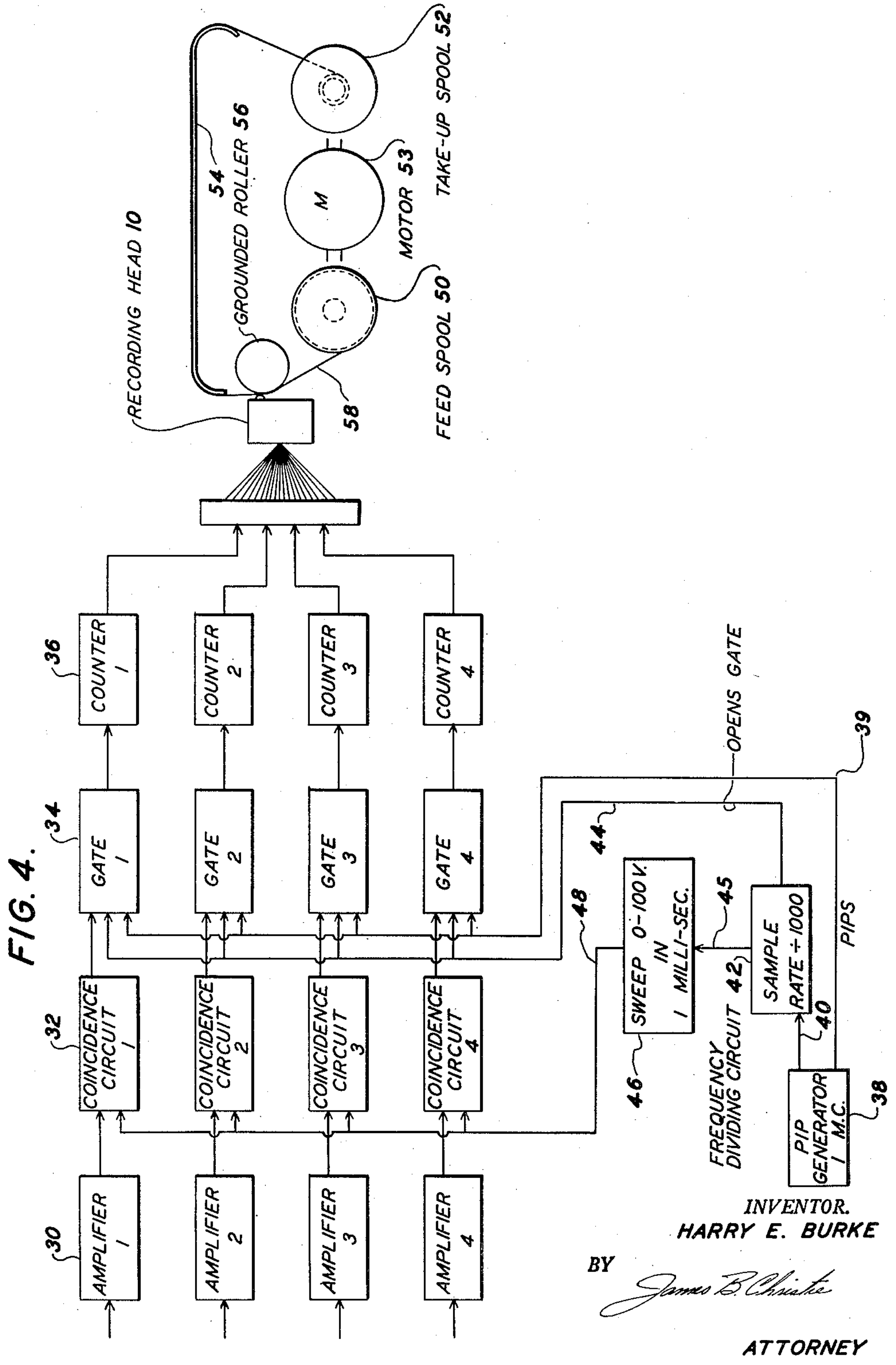
Fig. 4 is a block diagram of one form of recording unit suitable for performance of the method of the invention and adapted to receive voltage signals proportional to the information to be recorded.

A great many means may be employed for energizing the styli to produce the binary digits as described. One such circuit for this purpose is illustrated in Fig. 4. This circuit includes four separate recording channels, each channel including an amplifier 30, coincidence circuit 32, gate circuit 34 and counter 36, the four counters being connected to the recording head to energize the styli in the manner to be described. A pip generator 38 is connected through a lead 40 to a frequency dividing circuit 42. The circuit 42 is in turn connected through a lead 44 to each of the gate circuits 34 and through a lead 45 to sweep generator 46. The sweep generator 46 is connected through a lead 48 to each of the conicidence circuits 32.

To record three decimal digits to $\frac{1}{10}\%$ accuracy, the pip generator is set to deliver pips at a megacycle rate; the frequency dividing circuit is set to deliver a signal to the several gate circuits and to the sweep generator at $\frac{1}{1000}$ the frequency of the pip generator. The sweep generator delivers a voltage from 0 to 100 volts to each of the coincidence circuits once in each millisecond. At the commencement of this cycle the frequency divider delivers a simultaneous signal to the gate circuits to open the gates to passage of pips from the pip generator to the counters 36. The period in which any given gate circuit is open depends upon the coincidence of the sweep voltage and signal voltage in the coincidence circuit. The sweep voltage builds up from 0 to 100 volts in a period corresponding to 1000 pips from the pip generator. At the moment of coincidence between the sweep voltage and the signal voltage the corresponding gate circuit is closed. The number of pips delivered from the pipe generator through the particular gate circuit to the respective counter being determined therefor as the function $$\frac{1000X}{100}$$

where X is the value of the signal voltage between 0 and 100 volts.

The counters 36 may be any of several conventional and commercially available types. These counters in the embodiment shown include three channels, one channel for each of the decimal points in the three decimal digit to be recorded and are interconnected to the recording head to energize appropriate ones of the styli connected with the respective counters. In the assumed example wherein thirty styli are set aside for each of the four recording channels, ten styli being used for each digit of the three digit data in each channel, the counters 36 will energize the appropriate ones of the styli to give a binary representation of the three digits.

In Fig. 4 the recording paper drive is shown schematically. The paper drive consists of a feed spool 50, take-up spool 52, drive motor 53 and a platen 54 across which the paper is carried from the feed spool to the take-up spool. The recording head is opposed by a grounded conductive roller 56 and electrolytically sensitive recording paper 58 is carried from feed spool 50 between the head 10 and roller 56 before traveling across the platen 54. The purpose of carrying the paper across the platen 54 is for visual or automatic data reduction after recordation at the head 10.

Figure 5:
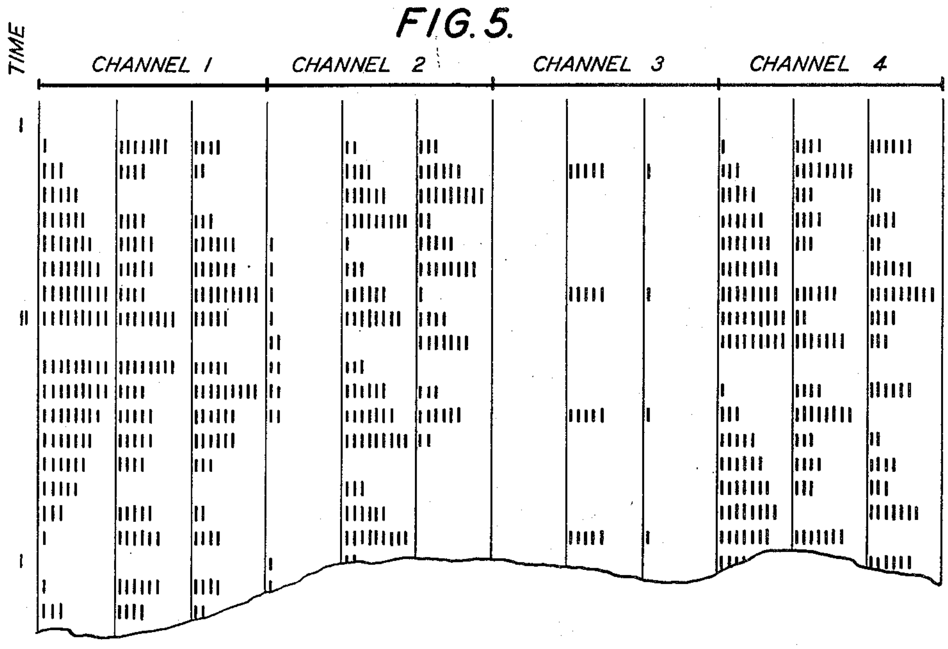
Fig. 5 is a sample record produced in accordance with the method of the invention.

A typical record as might be produced on the apparatus of Fig. 4 is shown in Fig. 5. This record is divided into four channels with each channel being subdivided into three separate columns, each column representing one of the digits of the three decimal number. At the left- and right-hand margins of the record a time column is included wherein time signals may be recorded by a first and last group of styli. In reading the chart the first number recorded in channel 1 shows a single digit in the left-hand column, seven digits in the central column and four digits in the right-hand column, the recorded number, therefore, being 174.

In the record, visual trends are indicated by the first digit in each channel, i. e. the left-hand column in each channel which is accurate to 10%. One percent accuracy is obtained in the central column of each channel and $\frac{1}{10}\%$ accuracy is obtained in the right-hand column of each channel.

It is not necessary to record all of the binary digits representing a given decimal digit in the manner shown in Fig. 5. For example, referring to the second number in channel 1, which is 342, it may be desirable to record only the third, fourth and second notations in the respective columns rather than all of the significant notations as in the illustrated chart.

The described recording technique constitutes essentially binary digital recording, and the binary digits may be arranged to represent information in many different ways. Four channel decimal digital use has been described with relation to Figs. 4 and 5. Other possible modifications include:

1. Connection as a 7 channel, 1% accuracy, decimal digital recorder. Such connection of a 150 stylus head would leave ten styli free for recording time lines, etc.

2. Connection as a 14 channel, 10% accuracy, decimal digital recorder, again leaving ten styli in a 150 stylus head for recordation of time lines, etc.

3. Connection directly to a circuit similar to an Eccles-Jordan trigger circuit type counter to give more than twice the number of channels for a given accuracy since only four styli instead of ten are needed to represent a digit.

4. For use in recording mass spectrometer peak heights, which application requires recording head and paper only one inch in width and permits faster chart rates than either photographic or potentiometric recording now in use.

Referring again to Fig. 4 it is to be understood that the invention is not limited to this particular circuit for energizing the styli responsive to data input to the circuit. In the circuit of Fig. 4 it is assumed that an electrical voltage is fed to the ampiifiers 30 proportional to the value of the sample function. The coincidence and gate circuits comprise an analog decimal ditigal converter and the counters 36 count the digital signal and energize the recording styli to give a binary representation of the decimal digit. The counters 36 may be electrical or mechanical in nature, the latter being energized by an electrical signal and being connected through suitable means to energize the appropriate styli.

The big advantage of the recording method of the invention is the ease of data reduction either visually or automatically from the binary record. Although the data is represented in a binary manner, visual trends are evident and automatic data reduction is extremely simple. Automatic reduction may be accomplished by photoelectric scanning or resistance scanning. In this latter regard it has been established that the resistance of the electrolytically sensitive paper decreases at the points where marks are made by the energized styli so that the value of the recorded number may be ascertained by measuring the resistance across a given section of the paper encompassing the recorded notation of that number. This type of data reduction can be employed only if the data is recorded in the manner shown in Fig. 5 where all of the significant notations are included. As an alternative, resistance scanning may be accomplished with a record in which only the last significant number in each column of a given channel is recorded by employing a location sensitive scanning device so that a resistance discontinuity at a given location in the channel will be indicative of the number represented by that symbol.

The invention relates to an improved method of recording using binary notations to represent decimal digitals. Many means, both mechanical and electrical, may be used to carry out the described method, and many variations in the manner and configuration of binary reproduction may be employed within the scope of the disclosed method.

I claim:

1. Apparatus for record digital information in a binary manner comprising a recording head with a plurality of closely spaced aligned styli adapted to engage an electrolytically sensitive paper transversely of its longitudinal axis, a counter connected to separately energize said styli in accordance with a count produced in said counter to mark said paper as a binary notation of said count, and means for actuating the counter, said actuating means comprising an amplifier adapted to receive and amplify an electrical signal proportional to the magnitude of the digit to be recorded, a coincidence circuit connected to receive the output of said amplifier, a sweep generator connected to deliver a uniformly varying voltage to said coincidence circuit, a gate circuit connected to said coincidence circuit and to said counter to close in response to coincidence in the coincidence circuit of the signal voltage and the sweep voltage, a pip generator, and a frequency dividing circuit, the pip generator being connected directly to the gate circuit to deliver electrical impulses at a uniform frequency through said gate circuit to the counter, the pip generator being also connected to the frequency dividing circuit and the frequency dividing circuit being connected to the sweep generator and to the gate circuit to trigger the sweep generator and to open the gate circuit at a frequency representing a fraction of the pip generator frequency.

2. In apparatus for recording digital information having a recording head with a plurality of spaced styli adapted to engage a current-sensitive recording paper along a line disposed at right angles to the length of the recording paper, and a counter connected to energize the styli in accordance with a count produced in said counter, means for actuating the counter comprising a coincidence circuit having an input circuit for receiving an electrical signal having a magnitude which is proportional to the numerical value of the digit to be recorded, a sweep generator connected to deliver a uniformly varying voltage to the coincidence circuit, a gate circuit connected to the coincidence circuit to close in response to coincidence in the coincidence circuit of the signal voltage and the sweep voltage, a pip generator, and a frequency dividing circuit, the pip generator being connected to the counter through the gate circuit to deliver electrical impulses at a uniform rate to the counter when the gate is closed, the pip generator being also connected to the frequency dividing circuit, and the frequency dividing circuit being connected to the sweep generator and to the gate circuit to trigger the sweep generator and to open the gate circuit at a frequency which is a fraction of the frequency of the pip generator.

3. Apparatus for providing a record of digital information comprising an amplifier adapted to receive and amplify an electrical signal proportional to the magnitude of the digit to be recorded, a coincidence circuit connected to receive the output of the amplifier, a sweep generator connected to deliver a uniformly varying voltage to the coincidence circuit, a gate circuit connected to the coincidence circuit to close in response to coincidence in the coincidence circuit of the signal voltage provided by the amplifier and the sweep voltage, a counter coupled to the output of the gate circuit, a pip generator coupled to the gate circuit to deliver electrical impulses at a uniform frequency through the gate to the counter, a frequency dividing circuit having its input circuit coupled to the pip generator and having its output coupled to the sweep generator and to the gate circuit to trigger the sweep generator and to open the gate circuit at a frequency representing a fraction of the pip generator frequency, and recording means coupled to the counter to provide a record of the information registered in the counter.

4. Apparatus for providing a record of digital information comprising a coincidence circuit having an input for receiving electrical signals having a magnitude representative of the magnitude of a digit to be recorded, a sweep generator connected to deliver a uniformly varying voltage to the coincidence circuit, a gate circuit connected to the coincidence circuit to close in response to coincidence in the coincidence circuit of the signal voltage provided by the amplifier and the sweep voltage, a counter coupled to the output of the gate circuit, a pip generator coupled to the gate circuit to deliver electrical impulses at a uniform frequency through the gate to the counter, means synchronized with the pip generator for triggering the sweep generator and opening the gate circuit at a frequency which is a predetermined fraction of the pip generator frequency, and recording means coupled to the counter to provide a record of the information registered in the counter.

5. Apparatus for registering digital information comprising a coincidence circuit having an input for receiving electrical signals having a magnitude proportional to the magnitude of numerical information to be registered, a sweep generator coupled to the coincidence circuit for providing a uniformly varying voltage, a gate circuit connected to the coincidence circuit to close in response to coincidence in the coincidence circuit of the signal voltage appled to its input and the sweep voltage, a counter coupled to the output of the gate circuit, a pip generator coupled to the gate circuit to deliver electrical impulses at a uniform frequency through the gate to be registered in the counter, and a frequency dividing circuit having its input coupled to the pip generator and having its output coupled to the sweep generator and to the gate circuit to trigger the sweep generator and to open the gate circuit at a frequency representing a fraction of the pip generator frequency.

6. Apparatus for registering digital information comprising a coincidence circuit having an input for receiving electrical signals having a magnitude representative of numerical information to be registered, a sweep generator coupled to the coincidence circuit for providing a uniformly varying voltage, a gate circuit connected to the coincidence circuit to close in response to coincidence in the coincidence circuit of the signal voltage applied to its input and the sweep voltage, a counter coupled to the output of the gate circuit, a pip generator coupled to the gate circuit to deliver electrical impulses at a uniform frequency through the gate to be registered in the counter, and means synchronized with the pip generator for triggering the sweep generator and opening the gate circuit at a frequency which is a predetermined fraction of the pip generator frequency.

7. Apparatus for registering digital information comprising a control circuit having an input for receiving electrical signals having a magnitude representative of numerical information to be registered, a sweep generator coupled to the control circuit for providing a voltage which varies in magnitude, a gate circuit connected to the control circuit to close when the magnitude of the sweep voltage which is applied to the control circuit exceeds the magnitude of the signal voltage which is applied to the input of the control circuit, a pulse generator coupled to the gate circuit for delivering electrical pulses at a uniform rate to the gate, means synchronized with the pulse generator for triggering the sweep generator and opening the gate circuit at a frequency which is a predetermined fraction of the pulse generator frequency, and means coupled to the output of the gate circuit for registering the pulses which are delivered from the pulse generator through the gate while the gate is open.

8. Apparatus for recording data representative of the magnitude of an electrical signal comprising an input circuit for receiving said signal, a counter circuit, means responsive to the magnitude of said electrical signal couple between the input and the counter circuit for periodically causing the counter circuit to register a number which corresponds to the magnitude of said electrical signal, a recording head having aligned spaced conductors for applying electric currents to a recording medium along a line at right angles to the length of the recording medium, and means coupling the spaced conductors to the counter for simultaneously energizing the same number of the spaced conductors as the numerical value of the number which is registered in the counter to simultaneously produce a series of marks on the recording medium with the number of marks in each series being equal to the numerical value of the number so that the marks indicate both the waveform and the magnitude of the electrical signal which is applied to the input circuit.

9. Apparatus for recording decimal digital data comprising a plurality of input circuits for receiving signals having magnitudes corresponding to the numerical value of the digits to be recorded, a plurality of counter circuits, means coupled between the respective input and counter circuits and responsive to the magnitudes of the signals at the input circuits for periodically causing the counter circuits to register numbers which correspond to the magnitudes of the signals at the input circuits, and a recording head having a plurality of aligned conductors for applying electric currents to a recording medium along a line at right angles to the length of the recording medium, the aligned conductors being arranged in groups and the respective groups of conductors being coupled to the respective counters to simultaneously energize the same number of the conductors in each group as the numerical value of the number which is registered in the counter to which it is coupled.

References Cited in the file of this patent

UNITED STATES PATENTS

| | | |
|---|---|---|
| 2,163,183 | Baagoe | June 20, 1939 |
| 2,401,621 | Desch et al. | June 4, 1946 |
| 2,444,042 | Hartley | June 29, 1948 |
| 2,500,809 | Fennessy et al. | Mar. 14, 1950 |
| 2,501,791 | Silverman | Mar. 28, 1950 |
| 2,513,112 | Shepherd | June 27, 1950 |
| 2,539,623 | Heising | Jan. 30, 1951 |
| 2,549,071 | Dusek et al. | Apr. 17, 1951 |
| 2,566,078 | Bliss | Aug. 28, 1951 |

OTHER REFERENCES

"Recorder and Timer for Short Intervals," Warren H. Bliss, published by RCA Laboratories, 1948.